(12) United States Patent
Mertz et al.

(10) Patent No.: US 9,510,254 B2
(45) Date of Patent: Nov. 29, 2016

(54) MSC POOL MOBILE TRAFFIC DISTRIBUTION

(71) Applicant: TELEFONAKTIEBOLAGET L M ERICSSON (PUBL), Stockholm (SE)

(72) Inventors: Michael Mertz, McKinney, TX (US); Robert Swanson, Boca Raton, FL (US); Mark Hebert, Whitewright, TX (US)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 153 days.

(21) Appl. No.: 14/452,690

(22) Filed: Aug. 6, 2014

(65) Prior Publication Data

US 2016/0044561 A1    Feb. 11, 2016

(51) Int. Cl.
*H04W 72/00* (2009.01)
*H04W 36/12* (2009.01)
*H04L 12/803* (2013.01)
*H04L 12/863* (2013.01)
*H04W 8/02* (2009.01)
*H04W 36/30* (2009.01)
*H04W 88/18* (2009.01)
*H04W 24/00* (2009.01)
*H04W 60/00* (2009.01)
*H04W 28/08* (2009.01)

(52) U.S. Cl.
CPC ............ *H04W 36/12* (2013.01); *H04L 47/125* (2013.01); *H04L 47/6225* (2013.01); *H04W 8/02* (2013.01); *H04W 24/00* (2013.01); *H04W 36/30* (2013.01); *H04W 60/00* (2013.01); *H04W 88/18* (2013.01); *H04W 28/08* (2013.01)

(58) Field of Classification Search
CPC ............................. H04W 24/00; H04W 28/08
USPC ................. 455/436, 453, 454, 433
See application file for complete search history.

(56) References Cited

U.S. PATENT DOCUMENTS

| 6,097,951 A * | 8/2000 | Ernam | H04W 28/08 455/433 |
|---|---|---|---|
| 7,054,629 B2 | 5/2006 | Turina et al. | |
| 2003/0028644 A1 | 2/2003 | Maguire et al. | |
| 2011/0228672 A1* | 9/2011 | Bianconi | H04W 48/06 370/230 |
| 2012/0009972 A1* | 1/2012 | Viering | H04W 36/22 455/525 |

(Continued)

FOREIGN PATENT DOCUMENTS

| EP | 1329121 A1 | 7/2003 |
|---|---|---|
| WO | 0249391 A1 | 6/2002 |

(Continued)

OTHER PUBLICATIONS

3$^{rd}$ Generation Partnership Project; Technical Specification Group Services and System Aspects; Intra-domain connection of Radio Access Network (RAN) nodes to multiple Core Network (CN) nodes (Release 12). 3GPP TS 23.236 v12.0.0 (Jun. 2013).

(Continued)

*Primary Examiner* — Chuck Huynh

(57) ABSTRACT

A management device and a method are described herein for managing an initial distribution of mobile stations to individual core network nodes (MSC/VLRs) within a core network node pool (MSC-pool) and/or for managing a redistribution of one or more of the mobile stations across the core network nodes (MSC/VLRs) within the core network node pool (MSC-pool) when an unbalanced condition is detected within the core network node pool (MSC-pool).

22 Claims, 5 Drawing Sheets

(56) References Cited

U.S. PATENT DOCUMENTS

| | | | |
|---|---|---|---|
| 2013/0100813 A1* | 4/2013 | Velamati | H04W 8/12 370/236 |
| 2014/0148175 A1* | 5/2014 | Luo | H04W 28/08 455/445 |

FOREIGN PATENT DOCUMENTS

| | | |
|---|---|---|
| WO | 03019958 A1 | 3/2003 |
| WO | 2011062542 A1 | 5/2011 |
| WO | 2013175432 A2 | 11/2013 |

OTHER PUBLICATIONS $3^{rd}$ Generation Partnership Project 2: Interoperability Specification (IOS) for MSC Pool Network. 3GPP2 A.S0018-0 v1.0 (Dec. 2009).
$3^{rd}$ Generation partnership Project 2: "System Requirements for MSC Pool". 3GPP2 S.R0136-0 v1.0 (Oct. 30, 2008).

* cited by examiner

MSC POOL MOBILE TRAFFIC DISTRIBUTION

TECHNICAL FIELD

The present invention relates to a management device and a method for managing an initial distribution of mobile stations to individual core network nodes (MSC/VLRs) within a core network node pool (MSC-pool) and/or managing a redistribution of one or more of the mobile stations across the core network nodes (MSC/VLRs) within the core network node pool (MSC-pool) when an unbalanced condition is detected within the core network node pool (MSC-pool).

BACKGROUND

The following abbreviations are herewith defined, at least some of which are referred to within the following description of the prior art and the present invention.
BSC Base Station Controller
BTS Base Transceiver Station
CNN Core Network Node
CN Control Node
CPU Central Processing Unit
GPRS General Packet Radio Service
IMSI International Mobile Subscriber Identity
IOS Interoperability Specification
MSC Mobile Switching Center
NRI Network Reference Identifier
RAN Radio Access Network
SNSF Serving Node Selection Function
UTIL CPU Utilization
VLR Visiting Location Register A wireless telecommunications network is normally divided into an access network and a core network. In one type of a wireless telecommunications network, the access network includes Base Transceiver Stations (BTSs) and control nodes such as Base Station Controllers (BSCs), while the core network includes core network nodes (CNN) such as Mobile Switching Centers (MSCs), Visiting Location Registers (VLRs), Home Location Registers (HLRs), and a GPRS Support Node (GSN) if the wireless telecommunications network supports GPRS.

Typically, each BSC (control node) in a specific geographical area of the access network is served by one specific MSC (core network node). This means that each BSC always communicates with one dedicated MSC that serves the specific geographical area (MSC Service Area) of the wireless telecommunications network. When a mobile station requests a service from the wireless telecommunications network it will be registered with the dedicated MSC of the current geographical area (MSC Service Area) by the BSC. The subscriber information of the mobile subscriber, that is using the mobile station, is stored in the VLR that serves the dedicated MSC, i.e. the mobile station is registered in this VLR. It is a common practice to combine the VLR with the MSC into a MSC/VLR, which means that the mobile station is registered in a MSC/VLR.

A new type of architecture for a wireless telecommunications network is to create a pool of core network nodes, e.g. a pool of MSC/VLR's, that is connected to one or more access networks, e.g. to control nodes (BSCs). This means that each BSC/BTS can access a number of MSC/VLR's and that a MSC/VLR in a pool of MSC/VLR's can serve a mobile station in a larger geographical area than in a "normal" MSC service area. The service area that is supported by all MSC/VLR's in the MSC-pool is called the MSC-pool service area. In this case, the MSC service area of each MSC/VLR in the pool will be the same area as the MSC-pool service area. A pool of core network nodes is also called a CNN-pool. If it is a pool of MSC/VLR's then it is called a MSC-pool for simplicity.

There are several advantages associated with using this "pooled" architecture which are as follows:
Reduction in the amount of inter-MSC handovers.
Full MSC/VLR redundancy in the case of loss due to natural disaster, hardware or software failure, or required maintenance actions.
Reduction in the inter-MSC/VLR location updates.
Reduction in the number of HLR updates.
Reduction in the number of hard handoffs.

A wireless telecommunications network having a pool of MSC/VLRs provides a solution for maintaining a network where MSC/VLR redundancy exits. This wireless telecommunications network includes all of the necessary signaling connections between each one of the BSCs with multiple MSCs, so that mobile stations served by any BSC of that MSC-pool serving area could be served by any MSC/VLR within the MSC-pool. Under this configuration, when one MSC/VLR in the pool goes out-of-service due to a natural disaster, hardware failure, software failure, etc. . . . , then the other MSC/VLRs in the MSC-pool can continue to provide service with little or no delay to the registered mobile stations.

Within this type of wireless telecommunications network, there is a necessary function where each mobile station that requests service from the MSC-pool serving area must upon registration (explicit/implied) be assigned to a MSC/VLR. How this function assigns mobile stations to the MSC/VLR is important because this initial mobile station-to-MSC/VLR mapping provides the necessary load-distribution (and load-balancing) amongst the MSC/VLRs within the MSC-pool.

This initial mobile station assignment happens when a mobile station powers up in the MSC-pool service area of the MSC-pool or roams from another service area into the MSC-pool service area of the MSC-pool. The initial mobile station assignment responsibility is handled by a management device (also referred to in the art as a service node selection function, a selection function, or a core node selection function) which uses a distribution algorithm to select a MSC/VLR within the MSC-pool.

In addition to the initial mobile station assignment, the management device may have the responsibility to initiate a redistribution of mobile station information between the MSC/VLRs in the MSC-pool, e.g., register the mobile station with another MSC/VLR within the MSC-pool when an unbalanced MSC-pool is detected during normal operations and runtime events. For example, there may be an unbalanced MSC-pool when a MSC/VLR (or any of its components) is brought back in-to-service after being out-of-service for maintenance (hardware or software), a MSC/VLR upgrade, MSC/VLR hardware additions/removal, or when a new MSC/VLR is added to the MSC-pool. This reassignment should not affect the end users' experience with the mobile station, especially with respect to service availability and reachability. The existing management device may work well in certain situations but there is always a desire to improve the management of the initial mobile station assignment to individual MSC/VLRs in the MSC-pool and/or the management of the redistribution of mobile stations between the MSC/VLRs in the MSC-pool when an unbalanced MSC-pool is detected during normal operations and runtime events.

SUMMARY

A management device and a method for implementing at least one of a mobile station initial distribution scheme and a mobile station redistribution scheme to improve the state-of-the-art are described in the independent claims of the present application. Advantageous embodiments of the management device and method have been described in the dependent claims of the present application.

In one aspect, the present invention comprises a management device configured to implement at least one of a mobile station initial distribution scheme and a mobile station redistribution scheme, wherein the management device is in a wireless telecommunications network which further comprises at least a plurality of core network nodes (e.g., MSC/VLRs) which form a core network node pool (e.g., MSC-pool), a plurality of mobile stations, and a plurality of control nodes (e.g., BSCs) The management device comprises at least one processor and at least one memory that stores processor-executable instructions, wherein the at least one processor interfaces with the at least one memory to execute the processor-executable instructions, whereby said management device is operable to (1) collect data from each of the core network nodes; (2) store the collected data in a database; and (3) implement at least one of the mobile station initial distribution scheme and the mobile station redistribution scheme. The mobile station initial distribution scheme includes determining whether or not one of the mobile stations has requested registration with one of the control nodes. If a result of the determining operation is yes, then assign the mobile station to one of the core network nodes, wherein the assignment of the mobile station to one of the core network nodes is based at least in part on the collected data. If a result of the determining operation is no, then continue to collect and store data from each of the core network nodes and repeat the determination operation. The mobile station redistribution scheme comprises detecting if there is an unbalanced condition within the core network node pool. If a result of the detecting operation is yes, then reassign one or more mobile stations to different core network nodes, wherein the reassignment of the one or more of the mobile station is based at least in part on the collected data. If a result of the detecting operation is no, then continue to collect and store data from each of the core network nodes and repeat the detect operation. The management device has an advantage in that by implementing at least one of the mobile station initial distribution scheme and the mobile station redistribution scheme will result in a balanced workload across the resources of the core network node pool.

In another aspect, the present invention comprises a method in a management device which is configured to implement at least one of a mobile station initial distribution scheme and a mobile station redistribution scheme, wherein the management device is in a wireless telecommunications network which further comprises at least a plurality of core network nodes (e.g., MSC/VLRs) which form a core network node pool (e.g., MSC-pool), a plurality of mobile stations, and a plurality of control nodes (e.g., BSCs). The method comprises following operations: (1) collect data from each of the core network nodes; (2) store the collected data in a database; and (3) implement at least one of the mobile station initial distribution scheme and the mobile station redistribution scheme. The mobile station initial distribution scheme includes determining whether or not one of the mobile stations has requested registration with one of the control nodes. If a result of the determining operation is yes, then assign the mobile station to one of the core network nodes, wherein the assignment of the mobile station to one of the core network nodes is based at least in part on the collected data. If a result of the determining operation is no, then continue to collect and store data from each of the core network nodes and repeat the determination operation. The mobile station redistribution scheme comprises detecting if there is an unbalanced condition within the core network node pool. If a result of the detecting operation is yes, then reassign one or more mobile stations to different core network nodes, wherein the reassignment of the one or more of the mobile station is based at least in part on the collected data. If a result of the detecting operation is no, then continue to collect and store data from each of the core network nodes and repeat the detect operation. The method has an advantage in that by implementing at least one of the mobile station initial distribution scheme and the mobile station redistribution scheme will result in a balanced workload across the resources of the core network node pool.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
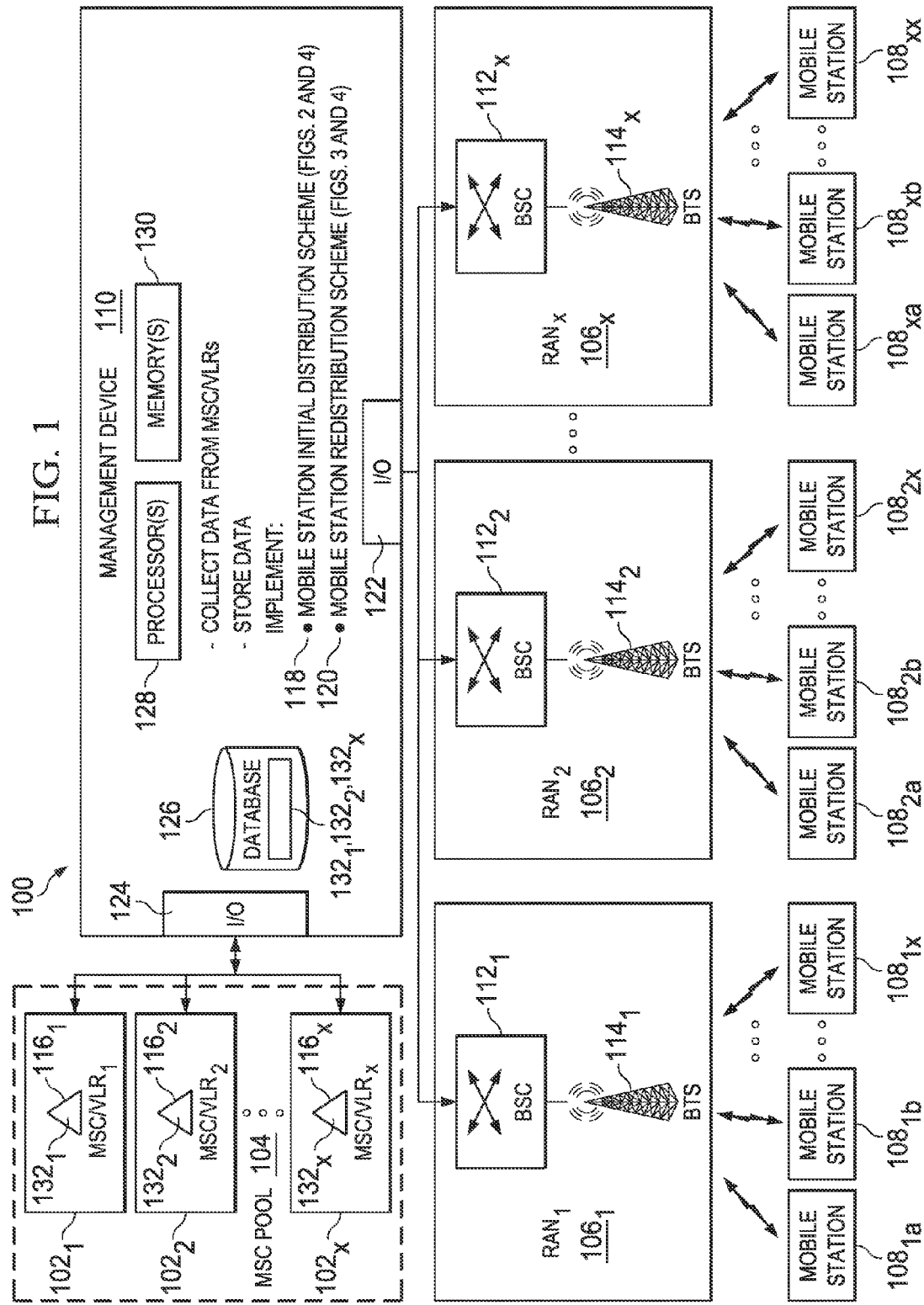
FIG. 1 is a diagram of a wireless telecommunications network comprising core network nodes (e.g., MSC/VLRs) which form a core network node pool (e.g., MSC-pool), RAN interfaces, mobile stations, and a new management device (e.g., new service node selection function, new selection function or new core node selection function) which is configured in accordance with an embodiment of the present invention.

Referring to FIG. 1, there is shown a diagram of a wireless telecommunications network 100 comprising core network nodes $102_1, 102_2 \ldots 102_x$ (e.g., MSC/VLRs $102_1, 102_2 \ldots 102_x$) which form a core network node pool 104

(e.g., MSC-pool 104), RAN interfaces $106_1, 106_2 \ldots 106_x$, mobile stations $108_{1a}, 108_{1b} \ldots 108_{1x}, 108_{2a}, 108_{2b} \ldots 108_{2x}$ and $108_{xa}, 108_{xb} \ldots 108_{xx}$, and a new management device 110 (e.g., new service node selection function 110, new selection function 110 or new core node selection function 110) which is configured in accordance with an embodiment of the present invention. As shown, the MSC-pool 104 is connected to the management device 110 which in turn is connected to the RAN interfaces $106_1, 106_2 \ldots 106_x$. The RAN interfaces $106_1, 106_2 \ldots 106_x$ each comprise a control node $112_1, 112_2 \ldots 112_x$ (e.g., BSC $112_1, 112_2 \ldots 112_x$) and a BTS $114_1, 114_2 \ldots 114_x$. The RAN interfaces $106_1, 106_2 \ldots 106_x$ are responsible for receiving registration (explicit or implicit) requests and origination requests from their respective mobile stations $108_{1a}, 108_{1b} \ldots 108_{1x}, 108_{2a}, 108_{2b} \ldots 108_{2x}$ and $108_{xa}, 108_{xb} \ldots 108_{xx}$. In this example, RAN interface $106_1$ is connected to mobile stations $108_{1a}, 108_{1b} \ldots 108_{1x}$, while RAN interface $106_2$ is connected to mobile stations $108_{2a}, 108_{2b} \ldots 108_{2x}$, and RAN interface $106_x$ is connected to mobile stations $108_{xa}, 108_{xb} \ldots 108_{xx}$.

The management device 110 is responsible for assigning each of the mobile stations $108_{1a}, 108_{1b} \ldots 108_{1x}, 108_{2a}, 108_{2b} \ldots 108_{2x}$ and $108_{xa}, 108_{xb} \ldots 108_{xx}$ to one of the MSC/VLRs $102_1, 102_2 \ldots 102_x$ during the registration or origination request handling process (discussed in more detail below). In addition, the management device 110 is responsible for managing a redistribution of one or more of the mobile stations $108_{1a}, 108_{1b} \ldots 108_{1x}, 108_{2a}, 108_{2b} \ldots 108_{2x}$ and $108_{xa}, 108_{xb} \ldots 108_{xx}$ across the MSC/VLRs $102_1, 102_2 \ldots 102_x$ when an unbalanced condition is detected within the MSC-pool 104 (discussed in more detail below). The MSC/VLRs $102_1, 102_2 \ldots 102_x$ each comprise a processing unit $116_1, 116_2 \ldots 116_x$ which maintains mobile subscriber information associated with the specific mobile stations $108_{1a}, 108_{1b} \ldots 108_{1x}, 108_{2a}, 108_{2b} \ldots 108_{2x}$ and $108_{xa}, 108_{xb} \ldots 108_{xx}$ that they have been assigned to provide the necessary call control. It should be appreciated that the wireless telecommunications network 100, the MSC/VLRs $102_1, 102_2 \ldots 102_x$, the RAN interfaces $106_1, 106_2 \ldots 106_x$, and the management device 110 etc. . . . all contain components and functionalities which are well known in the field but for clarity only those components and functionalities which are needed to explain and enable the present invention have been described herein. Further, the new management device 110 is shown and described herein as being part of the wireless telecommunications network 100 configured per the CDMA2000 standard but it should be appreciated that the new management device 110 can be part of a wireless telecommunications network that is configured per GSM, UMTS, and WCDMA standards.

For purposes of this discussion, there are two scenarios where the management node 110 assigns a mobile station $108_{1a}$ (for example) to a MSC/VLR $102_1$ (for example) in the MSC-pool 104 which are important:

1. The initial assignment of a mobile station $108_{1a}$ (for example) to a MSC/VLR $102_1$ (for example) in the MSC-pool 104 during the mobile station $108_{1a}$'s first access to the MSC-pool 104 via a registration (explicit or implicit) request. An implicit registration is performed during an origination request from a mobile station $108_{1a}$ (for example) which has not yet registered within the MSC serving area. For example, an explicit registration is performed during the power up of mobile station $108_{1a}$, the mobile station $108_{1a}$ roaming in to a new MSC-pool serving area, or a time-based registration of the mobile station $108_{1a}$. This scenario is referred to herein with respect to the "mobile station initial distribution scheme 118".

2. The real-time reassignment of a mobile station $108_{2a}$ (for example) from a MSC/VLR $102_1$ (for example) to another MSC/VLR $102_2$ (for example) within the MSC-pool 104 when a mobile station out-of-balance condition is detected within the MSC-pool 104. This scenario is referred to herein with respect to the "mobile station redistribution scheme 120".

The management device 110 is configured to implement one or both of the initial mobile station distribution scheme 118 and the mobile station redistribution scheme 120. More specifically, the management device 110 is configured to balance the mobile station initial assignments across the MSC-pool 104 and/or to redistribute the mobile stations across the MSC-pool 104 when detecting an unbalance condition in the MSC-pool 104. In one embodiment, the management device 110 comprises at least the following components: (1) an input-output interface 122 which interfaces with the RAN interfaces $106_1, 106_2 \ldots 106_x$; (2) an input-output interface 124 which interfaces with the MSC/VLRs $102_1, 102_2 \ldots 102_x$ which form the MSC-pool 104 (note: the input-output interfaces 122 and 124 can be the same component); (3) a database 126; (4) at least one processor 128; and (5) at least one memory 130. The at least one processor 128 interfaces with the at least one memory 130 to execute processor-executable instructions which are stored within the at least one memory 130, whereby the management device 110 is operable to: (1) collect data $132_1, 132_2 \ldots 132_x$ from each of the MSC/VLRs $102_1, 102_2 \ldots 102_x$; (2) store the collected data $132_1, 132_2 \ldots 132_x$ in the database 126; and (3) implement at least one of the mobile station initial distribution scheme 118 and the mobile station redistribution scheme 120. An exemplary mobile station initial distribution scheme 118 is described in detail below with respect to FIGS. 2 and 5 and an exemplary mobile station redistribution scheme 120 is described in detail below with respect to FIGS. 3-5.

Mobile Station Initial Distribution Scheme 118

To ensure that the number of mobile stations $108_{1a}, 108_{1b} \ldots 108_{1x}, 108_{2a}, 108_{2b} \ldots 108_{2x}$ and $108_{xa}, 108_{xb} \ldots 108_{xx}$ assigned to each MSC/VLR $102_1, 102_2 \ldots 102_x$ is balanced across all of the MSC/VLRs $102_1, 102_2 \ldots 102_x$ in the MSC-pool 104, the management device 110 uses a dynamic mobile initial distribution scheme 118 instead of a static mapping scheme. In particular, the assignment of a mobile station $108_{1a}$ (for example) to a MSC/VLR $102_1$ (for example) in the MSC-pool 104 during the mobile station's initial access to the MSC-pool 104 will be based on runtime conditions and statistics that change dynamically which ensures a mobile station-based balanced MSC-pool 104.

When a mobile station $108_{1a}$ (for example) accesses the MSC-pool 104 for the first time, the management device 110 makes a decision as to which MSC/VLR $102_1$ (for example) will service that mobile station $108_{1a}$ (for example) based on statistics collected (data $132_1, 132_2 \ldots 132_x$) from each MSC/VLR $102_1, 102_2 \ldots 102_x$ in the MSC-pool 104. The dynamic mobile initial distribution scheme 118 could be a purely round robin scheme in which the mobile stations $108_{1a}, 108_{1b} \ldots 108_{1x}, 108_{2a}, 108_{2b} \ldots 108_{2x}$ and $108_{xa}, 108_{xb} \ldots 108_{xx}$ are initially assigned across all the currently available MSC/VLRs $102_1, 102_2 \ldots 102_x$ in the MSC-pool 104 (for example one mobile station assigned to MSC/VLR $102_1$, the next mobile station assigned to MSC/VLR $102_2$ and so on). Alternatively, the dynamic mobile initial distribution scheme 118 could use the data $132_1, 132_2 \ldots 132_x$ collected from each MSC/VLR $102_1, 102_2 \ldots 102_x$ such as (for example): (1) a number of currently registered mobile stations $108_{1a}, 108_{1b} \ldots 108_{1x}, 108_{2a}, 108_{2b} \ldots 108_{2x}$ and $108_{xa}, 108_{xb} \ldots 108_{xx}$ in each of the MSC/VLRs $102_1, 102_2 \ldots 102_x$; (2) a capacity potential of each of the MSC/VLRs $102_1, 102_2 \ldots 102_x$; (3) a current capacity load of each of the MSC/VLRs $102_1, 102_2 \ldots 102_x$; and (4) a number of mobile stations $108_{1a}, 108_{1b} \ldots 108_{1x}, 108_{2a}, 108_{2b} \ldots 108_{2x}$ and $108_{xa}, 108_{xb} \ldots 108_{xx}$ currently located in each BSC $112_1, 112_2 \ldots 112_x$ in each of the MSC/VLRs $102_1, 102_2 \ldots 102_x$ to assign the mobile station $108_{1a}$ (for example) to one of the MSC/VLRs $102_1$ (for example). These schemes and more are described in detail next with respect to FIG. 2.

Figure 2:
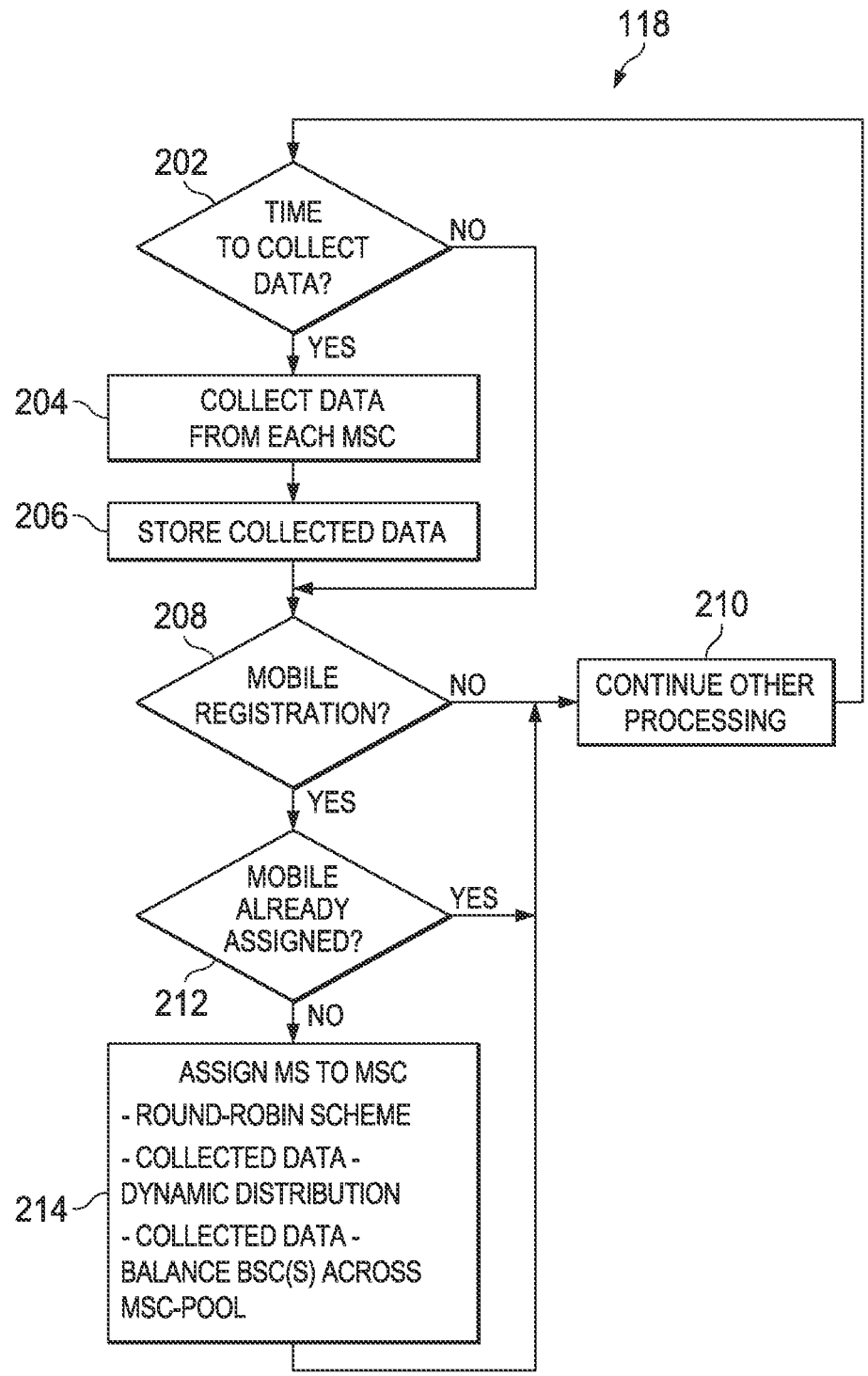
FIG. 2 is a flowchart illustrating an exemplary mobile station initial distribution scheme implemented in the new management device in accordance with an embodiment of the present invention.

Referring to FIG. 2, there is a flowchart illustrating an exemplary mobile station initial distribution scheme 118 which is implemented in the management device 110 in accordance with an embodiment of the present invention. Beginning at step 202, the management device 110 determines if it is time to collect the data $132_1, 132_2 \ldots 132_x$ from each of the MSC/VLRs $102_1, 102_2 \ldots 102_x$. If the result of step 202 is yes, then the management device 110 at step 204 collects the data $132_1, 132_2 \ldots 132_x$ from each of the MSC/VLRs $102_1, 102_2 \ldots 102_x$ (e.g., periodically collect the data $132_1, 132_2 \ldots 132_x$ for instance several times a day). After step 204, the management device 110 at step 206 stores the collected data $132_1, 132_2 \ldots 132_x$ in the database 126. After step 206 or if the result of step 202 is no, the management device 110 at step 208 determines if one of the mobile stations $108_{1a}$ (for example) has requested registration (explicit or implicit) with one of the BSCs $112_1, 112_2 \ldots 112_x$. If the result of step 208 is no, then the management device 110 at step 210 continues other processing before returning to step 202. If the result of step 208 is yes, then the management device 110 at step 212 determines if the mobile station $108_{1a}$ (for example) has already been assigned to one of the MSC/VLRs $102_1, 102_2 \ldots 102_x$. If the result of step 212 is yes, then the management device 110 performs step 210 before returning to step 202. If the result of step 212 is no, then the management device 110 at step 214 assigns the mobile station $108_{1a}$ (for example) to one of the MSC/VLRs $102_1, 102_2 \ldots 102_x$, wherein the assignment of the mobile station $108_{1a}$ (for example) to one of the MSC/VLRs $102_1, 102_2 \ldots 102_x$ is based at least in part on the collected data $132_1, 132_2 \ldots 132_x$. There are many ways that the management device 110 can use the collected data $132_1, 132_2 \ldots 132_x$ to assign the mobile station $108_{1a}$ (for example) to one of the MSC/VLRs $102_1, 102_2 \ldots 102_x$. For instance, the management device 110 can use the collected data $132_1, 132_2 \ldots 132_x$ to determine which of the MSC/VLRs $102_1, 102_2 \ldots 102_x$ are currently available and then use a round-robin-scheme to assign the mobile station $108_{1a}$ (for example) to one of the currently available MSC/VLR $102_1$. In another example, the management device 110 can use the collected data $132_1, 132_2 \ldots 132_x$ which can comprises at least one of (for example): (1) a number of currently registered mobile stations $108_{1a}, 108_{1b} \ldots 108_{1x}, 108_{2a}, 108_{2b} \ldots 108_{2x}$ and $108_{xa}, 108_{xb} \ldots 108_{xx}$ in each of the MSC/VLRs $102_1, 102_2 \ldots 102_x$; (2) a capacity potential of each of the MSC/VLRs $102_1, 102_2 \ldots 102_x$; (3) a current capacity load of each of the MSC/VLRs $1021, 1022 \ldots 102x$; and (4) a number of mobile stations $108_{1a}, 108_{1b} \ldots 108_{1x}, 108_{2a}, 108_{2b} \ldots 108_{2x}$ and $108_{xa}, 108_{xb} \ldots 108_{xx}$ currently registered at each BSC $112_1, 112_2 \ldots 112_x$ served by each of the MSC/VLRs $102_1, 102_2 \ldots 102_x$ to assign the mobile station $108_{1a}$ (for example) to one of the MSC/VLRs $102_1$ (for example). In yet another example, the management device 110 can use the collected data $132_1, 132_2 \ldots 132_x$ when assigning the mobile station $108_{1a}$ (for example) to one of the MSC/VLRs $102_1$ (for example) so as to balance a load of each BSC $112_1, 112_2 \ldots 112_x$ across the MSC-pool 104. After step 214, the management device 110 performs step 210 before returning to step 202.

Mobile Station Redistribution Scheme 120

The mobile station redistribution scheme 120 has two main objectives which are to (a) detect, at runtime, when the MSC-pool 104 is unbalanced, and (b) automatically correct the MSC-pool 104 imbalance, at runtime, once detected.

In regards to the first objective, the management device 110 is configured per one exemplary embodiment to detect and declare that the MSC-pool 104 is out-of-balance when the following criteria exist:

1. The total number of registered mobile stations $108_{1a}, 108_{1b} \ldots 108_{1x}, 108_{2a}, 108_{2b} \ldots 108_{2x}$ and $108_{xa}, 108_{xb} \ldots 108_{xx}$ at each MSC/VLR $102_1, 102_2 \ldots 102_x$ in the MSC-pool 104 is not equal at each MSC/VLR $102_1, 102_2 \ldots 102_x$, 2. The total number of registered mobile stations $108_{1a}, 108_{1b} \ldots 108_{1x}, 108_{2a}, 108_{2b} \ldots 108_{2x}$ and $108_{xa}, 108_{xb} \ldots 108_{xx}$ at each BSC $112_1, 112_2 \ldots 112_x$, served by each MSC/VLR $102_1, 102_2 \ldots 102_x$ in the MSC-pool 104 is not equal at each BSC $112_1, 112_2 \ldots 112_x$, served by each MSC/VLR $102_1, 102_2 \ldots 102_x$.

Note: The mobile station redistribution scheme 120 stipulates that if the total number of mobile stations $108_{1a}, 108_{1b} \ldots 108_{1x}, 108_{2a}, 108_{2b} \ldots 108_{2x}$ and $108_{xa}, 108_{xb} \ldots 108_{xx}$ at each MSC/VLR $102_1, 102_2 \ldots 102_x$ is equal within a specified tolerance, e.g., 5%, then for the purposes of detecting an imbalance within the MSC-pool 104, the values are equal. The same caveat applies for determining whether the values of the total number of mobile stations at each BSC are equal. The purpose for using a tolerance, is due to the randomness of the mobile station registrations which means that at any instance in time the total number of mobile stations $108_{1a}, 108_{1b} \ldots 108_{1x}, 108_{2a}, 108_{2b} \ldots 108_{2x}$ and $108_{xa}, 108_{xb} \ldots 108_{xx}$ at each MSC/VLR $102_1, 102_2 \ldots 102_x$ will never be exactly equal.

In order to truly have a mobile-based balanced MSC-pool 104, the location of each mobile station $108_{1b} \ldots 108_{1x}, 108_{2a}, 108_{2b} \ldots 108_{2x}$ and $108_{xa}, 108_{xb} \ldots 108_{xx}$ becomes important. Each MSC/VLR $102_1, 102_2 \ldots 102_x$ in the MSC-pool 104 can have an equal number of mobile stations $108_{1a}, 108_{1b} \ldots 108_{1x}, 108_{2a}, 108_{2b} \ldots 108_{2x}$ and $108_{xa}, 108_{xb} \ldots 108_{xx}$ from a system perspective, but if one MSC/VLR $102_x$ (for example) has more mobile stations $108_{1a}, 108_{1b} \ldots 108_{1x}$ (for example) assigned at one BSC location (e.g., BSC $112_1$ location) than the other MSC/VLRs $102_1, 102_2 \ldots 102_{x-1}$ have at the same BSC location (e.g. BSC $112_1$ location), then the MSC/VLR $102_x$ (for example) with more mobile stations $108_{1a}, 108_{1b} \ldots 108_{1x}$ (for example) at that BSC location (e.g. BSC $112_1$ location) is more likely to have more work to do than the other MSC/VLRs $102_1, 102_2 \ldots 102_{x-1}$ in the MSC-pool 104. This is especially true if that BSC location (e.g., BSC $112_1$) is more heavily populated than other BSC locations (e.g., BSCs $112_2, 112_3 \ldots 112_x$) serviced by the MSC-pool 104.

As an example, assume there are three MSC/VLRs $102_1, 102_2$ and $102_3$ (MSC/VLRs 1, 2, and 3) and three BSCs $112_1, 112_2$ and $112_3$ (BSCs 1, 2 and 3) with assigned mobile stations $108_{1a}, 108_{1b} \ldots 108_{1x}, 108_{2a}, 108_{2b} \ldots 108_{2x}$ and $108_{xa}, 108_{xb} \ldots 108_{xx}$ as shown in TABLE #1.

TABLE #1

| MSC/VLR Node | BSC1 | BSC2 | BSC3 | Total |
|---|---|---|---|---|
| MSC/VLR 1 | 200 | 400 | 400 | 1000 |
| MSC/VLR 2 | 100 | 400 | 500 | 1000 |
| MSC/VLR 3 | 500 | 200 | 300 | 1000 |

Here, each MSC/VLR 1, 2 and 3 in the MSC-pool 104 has 1000 mobile stations assigned to them. However, looking at the BSC1 location, MSC/VLR 3 has twice or more mobile stations assigned than the other MSC/VLRs 1 and 2 in the MSC-pool 104. If all the mobile stations are equally active at the BSC1 location, then MSC 3 will be doing more work and therefore the MSC-pool 104 is not truly balanced.

Also, when the mobile station BSC-based location is not balanced as in the present example, then this also increases the recovery time after one of the more loaded MSC/VLRs fails with respect to the other MSC/VLRs in the MSC-pool 104. For instance, in the present example it will take a much longer time to recover (reassign the mobile stations $108_{1a}$, $108_{1b}$ ... $108_{1x}$ to the other MSC/VLRs in the MSC-pool 104) for the BSC1 location if the MSC/VLR 3 fails rather than if the MSC/VLR 2 fails.

Furthermore, the mobile station BSC-based location is very dynamic since mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ regularly move to different BSC locations. In order to create a better-balanced MSC-pool 104, the mobile station redistribution scheme 120 can implement a dynamic algorithm (process) to continually monitor the mobile station assignments based on BSC location and if desired other operational factors such as CPU utilization during the runtime operations in order to be able to reassign mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ to other MSC/VLRs $102_1$, $102_2$ ... $102_x$ in the MSC-pool 104 when the mobile station's BSC locations become imbalanced across all the MSC/VLRs $102_1$, $102_2$ ... $102_x$ in the MSC-pool 104.

In order for the management device 110 to be able to detect whether the MSC-pool 104 is out-of-balance, the total number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ registered and the total number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ located at each BSC $112_1$, $112_2$ ... $112_x$ need to be collected from each MSC/VLR $102_1$, $102_2$ ... $102_x$ in the MSC-pool 104. For example, the management device 110 could maintain within the database 126 the total number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ registered in the MSC-pool 104 and the total number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ located at each BSC $112_1$, $112_2$ ... $112_x$ for each MSC/VLR $102_1$, $102_2$ ... $102_x$ in the MSC-pool 104 by using the following technique:

MSC_MOBILE_STATIONS_PER_BSC[n, m], where n=MSC number and 0<m<x, where m is the BSC number, and x=maximum number of BSC configured in the MSC-pool.

The management device 110 determines whether there are more mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ located at any one of the BSCs $112_1$, $112_2$ ... $112_x$ at one of the MSC/VLRs $102_1$, $102_2$ ... $102_x$ versus any of the other MSC/VLRs $102_1$, $102_2$ ... $102_x$ in the MSC-pool 104. If so, then the MSC-pool 104 would be considered out-of-balance. To accomplish this the management device 110 could implement the following computer code (processor-executable instructions):

```
DIST_DATA [n, m]
  = ABS ( ( MSC_VLR_ENTRIES_PER_BSC [n, m]
      - AVG ( MSC_VLR_ENTRIES_PER_BSC [n, m] )
    )
    / AVG ( MSC_VLR_ENTRIES_PER_BSC [n, m] )
  ) * 100
IF DIST_DATA [n, m] > 0
then
  out of balance
else
  in-balance
endif
```

Where n=local MSC/VLR number, m=BSC number. The determination of whether a BSC $112_1$, $112_2$ ... $112_x$ is out of balance is computed for each BSC $112_1$, $112_2$ ... $112_x$ at each MSC/VLR $102_1$, $102_2$ ... $102_x$.

As discussed above, the management device 110 collects and stores in the database 126 at least the total number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ located at each BSC $112_1$, $112_2$ ... $112_x$ at each MSC/VLR $102_1$, $102_2$ ... $102_x$ in order to determine whether the MSC-pool 104 is out-of-balance. The question becomes, how often should the management device 110 collect this data $132_1$, $132_2$ ... $132_x$. This is probably specific to each wireless telecommunications network 100, but given the dynamic mobility of most mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$, it could be recommended that the management device 110 collect this data $132_1$, $132_2$ ... $132_x$ several times per day.

Under most circumstances, at any instance in time, the number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ at one of the BSCs $112_1$, $112_2$ ... $112_x$ at one of the MSC/VLRs $102_1$, $102_2$ ... $102_x$ will "statistically" never equal the number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ for that same BSC $112_1$, $112_2$ ... $112_x$ in any of the other MSC/VLRs $102_1$, $102_2$ ... $102_x$. This is due to the dynamic nature of the mobile station $108_{1a}$, $108_{1b}$ ... $108_{1x}$, $108_{2a}$, $108_{2b}$ ... $108_{2x}$ and $108_{xa}$, $108_{xb}$ ... $108_{xx}$ movement across the wireless telecommunications network 100, maintenance events, hardware outages, software outages, etc. . . . . . The management device 110 is able to detect an out-of-balance in the MSC-pool 104 using only a snapshot of data $132_1$, $132_2$ ... $132_x$ in time. Therefore, technically the MSC-pool 104 is always out-of-balance because one or more BSCs $112_1$, $112_2$ ... $112_x$ will always be out-of-balance across the MSC/VLRs $102_1$, $102_2$ ... $102_x$. To address this situation, the management device 110 is configured to implement a threshold in which to gauge "how" out-of-balance the MSC-pool 104 is and then use this threshold to determine whether the MSC-pool 104 needs to be rebalanced.

When the MSC-pool 104 is determined to be "out-of-balance" greater than the threshold, then the management device 110 will rebalance the MSC-pool 104. For instance, the management device 110 could implement the following computer code (processor-executable instructions) to determine if the MSC-pool 104's actual "out-of-balance" is greater than the "out-of-balance" threshold:

```
DIST_DATA [n, m]
  = ABS (( MSC_VLR_ENTRIES_PER_BSC [n, m]
        - AVG ( MSC_VLR_ENTRIES_PER_BSC [n, m] )
        )
        / AVG ( MSC_VLR_ENTRIES_PER_BSC [n, m] )
  ) * 100
IF DIST_DATA [n, m] > (x - (k/2))
then
  out of balance
else
  in-balance
endif
```

Where n=local MSC/VLR service ID, m=BSC number, k=number of MSCs in the pool, x=a constant that represents the maximum value of the threshold. The determination of whether a BSC is out of balance is computed for each BSC at each MSC/VLR.

Figure 3:
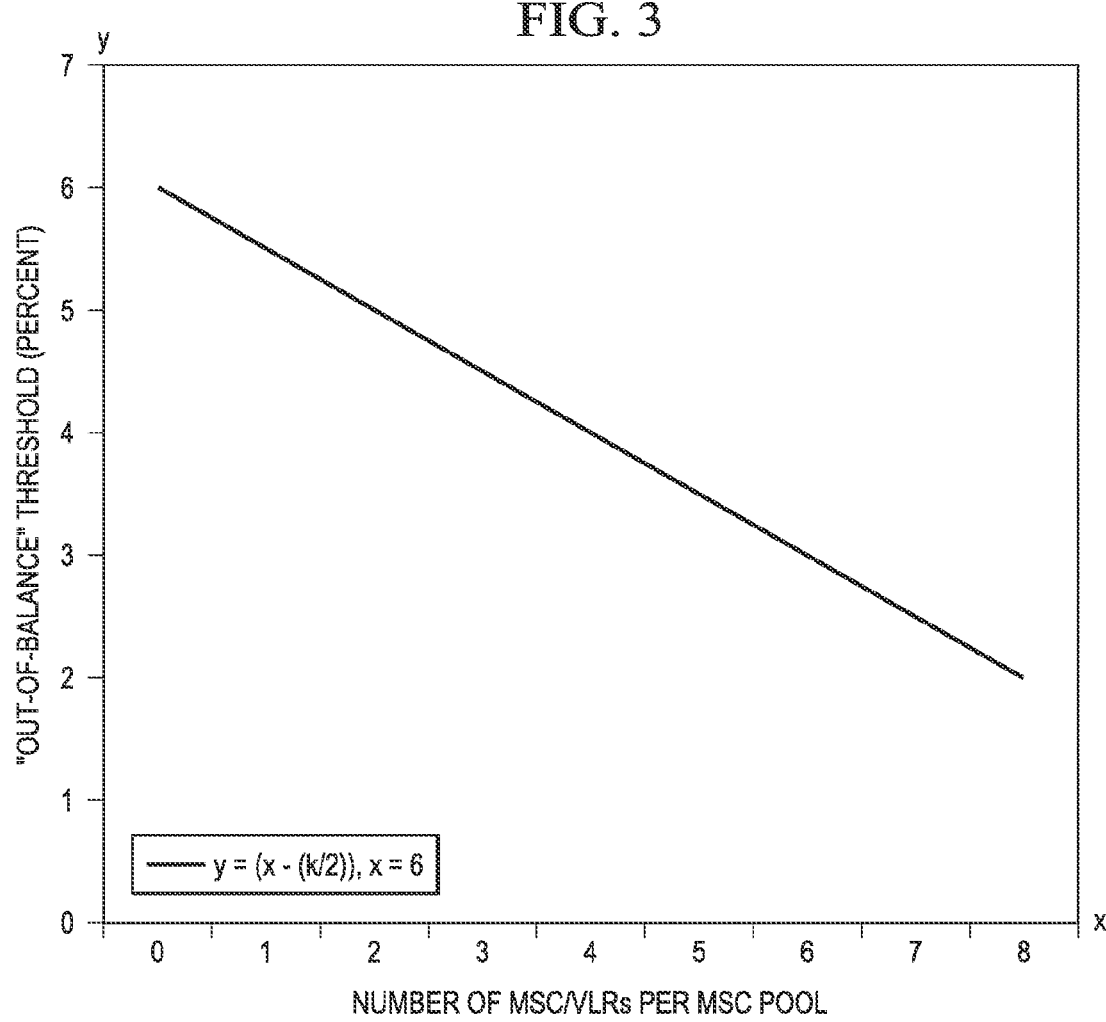
FIG. 3 is a graph which illustrates how the new management device can per an exemplary mobile station redistribution scheme set an "out-of-balance" threshold which is used to determine whether or not the MSC-pool should be rebalanced.

In this example, then "(x−(k/2))" becomes the out-of-balance threshold. This formula [y=(x−(k/2))] represents an inverse progression from a maximum value down to zero based on the number of MSC/VLRs $102_1$, $102_2 \ldots 102_x$ in the MSC-pool 104. For example: Setting x equal 6%, as the number of MSC/VLRs $102_1$, $102_2 \ldots 102_x$ in the MSC-pool 104 increases, then the out-of-balance threshold decreases. FIG. 3 is a graph which illustrates how the management device 110 can be configured to set this "out-of-balance" threshold.

Another factor that the management device 110 can consider in determining whether the MSC-pool 104 needs to be rebalanced is the "quality" of the collected data $132_1$, $132_2 \ldots 132_x$ in the database 126 where the mobile station $108_{1a}$, $108_{1b} \ldots 108_{1x}$, $108_{2a}$, $108_{2b} \ldots 108_{2x}$ and $108_{xa}$, $108_{xb} \ldots 108_{xx}$ assignments are maintained. The "quality" means how complete is the database 126 where the mobile station $108_{1a}$, $108_{1b} \ldots 108_{1x}$, $108_{2a}$, $108_{2b} \ldots 108_{2x}$ and $108_{xa}$, $108_{xb} \ldots 108_{xx}$ to MSC/VLR mapping is maintained. The "quality" of the database 126 is important since the mobile station $108_{1a}$, $108_{1b} \ldots 108_{1x}$, $108_{2a}$, $108_{2b} \ldots 108_{2x}$ and $108_{xa}$, $108_{xb} \ldots 108_{xx}$ reassignment is based on the collected data $132_1$, $132_2 \ldots 132_x$ stored in the database 126. The total number of mobile station records in the database 126 should always equal the total number of mobile stations $108_{1a}$, $108_{1b} \ldots 108_{1x}$, $108_{2a}$, $108_{2b} \ldots 108_{2x}$ and $108_{xa}$, $108_{xb} \ldots 108_{xx}$ owned by all MSC/VLRs $102_1$, $102_2 \ldots 102_x$ in the MSC-pool 104. The mobile station $108_{1a}$, $108_{1b} \ldots 108_{ix}$, $108_{2a}$, $108_{2b} \ldots 108_{2k}$ and $108_{xa}$, $108_{xb} \ldots 108_{xx}$ ownership is determined by whether a VLR record exists for a mobile station or not. A "high quality" database 126 is where the total number of database records equals the total number of mobile station VLRs across the MSC-pool 104, plus or minus a given threshold. Therefore, the MSC-pool 104 should also only be rebalanced when there is a "high quality" database 126.

Thus, in one example, the management device 110 would operate to rebalance the MSC-pool 104 if:
  The MSC-pool 104 is out of balance, and
  The database 126's records are not different than the MSC-pool 104 wide VLR count by more than (10−k) %, where k is the number of MSC/VLRs $102_1$, $102_2 \ldots 102_x$ in the MSC-pool 104.

Stated another way, when the following condition is True, then the database 126 is properly synchronized, in other words, the database 126 is of "high" quality:
If not ((abs(# database entries−# Pool wide VLR entries)/# Pool wide VLR entries)*100>(10−k))

Once the management device 110 detects that the MSC-pool 104 is out-of-balance and that the MSC-pool 104 should be rebalanced, then the management device 110 is configured to move the exact number of mobile stations $108_{1a}$, $108_{1b} \ldots 108_{1x}$, $108_{2a}$, $108_{2b} \ldots 108_{2x}$ and $108_{xa}$, $108_{xb} \ldots 108_{xx}$ per BSC $112_1$, $112_2 \ldots 112_x$ to each needed MSC/VLR $102_1$, $102_2 \ldots 102_x$ in order to perfectly balance each BSC $112_1$, $112_2 \ldots 112_x$ across all MSC/VLRs $102_1$, $102_2 \ldots 102_x$ in the MSC-pool 104. Even though the determination whether the MSC-pool 104 is out-of-balance is based on a threshold; i.e. being outside of a give range, the management device 110 ensures that the total number of mobile stations $108_{1a}$, $108_{1b} \ldots 108_{1x}$, $108_{2a}$, $108_{2b} \ldots 108_{2x}$ and $108_{xa}$, $108_{xb} \ldots 108_{xx}$ at each BSC $112_1$, $112_2 \ldots 112_x$ at each MSC/VLR $102_1$, $102_2 \ldots 102_x$ will be equal after redistribution period.

When redistributing mobile station information, the management device 110 calculates the number of mobile stations $108_{1a}$, $108_{1b} \ldots 108_{1x}$, $108_{2a}$, $108_{2b} \ldots 108_{2x}$ and $108_{xa}$, $108_{xb} \ldots 108_{xx}$ to reassign from each MSC/VLR $102_1$, $102_2 \ldots 102_x$ to every other MSC/VLR $102_1$, $102_2 \ldots 102_x$ for each BSC $112_1$, $112_2 \ldots 112_x$.

The redistribution of mobile station information is dynamic, in other words, the management device 110 should only move mobile stations $108_{1a}$, $108_{1b} \ldots 108_{1x}$, $108_{2a}$, $108_{2b} \ldots 108_{2x}$ and $108_{xa}$, $108_{xb} \ldots 108_{xx}$ that are active, e.g., using network resources or during a mobile registration (explicit or implicit) or origination. In this way, the management device 110 does not use resources to reassign mobile stations $108_{1a}$, $108_{1b} \ldots 108_{1x}$, $108_{2a}$, $108_{2b} \ldots 108_{2x}$ and $108_{xa}$, $108_{xb} \ldots 108_{xx}$ that are currently inactive (not using network resources).

The management device 110 can redistribute mobile station information (i.e. reassigns a mobile station $108_{1a}$, $108_{1b} \ldots 108_{1x}$, $108_{2a}$, $108_{2b} \ldots 108_{2x}$ and $108_{xa}$, $108_{xb} \ldots 108_{xx}$ to another MSC/VLR $102_1$, $102_2 \ldots 102_x$) when the MSC-pool 104 is unbalanced, first by identifying the mobile station as a candidate for reassignment, and if a candidate for reassignment, then assign the mobile station $108_{1a}$, $108_{1b} \ldots 108_{1x}$, $108_{2a}$, $108_{2b} \ldots 108_{2x}$ and $108_{xa}$, $108_{xb} \ldots 108_{xx}$ to a specific MSC/VLR $102_1$, $102_2 \ldots 102_x$ based on the mobile station redistribution calculations. A mobile station $108_{1a}$, $108_{1b} \ldots 108_{1x}$, $108_{2a}$, $108_{2b} \ldots 108_{2x}$ and $108_{xa}$, $108_{xb} \ldots 108_{xx}$ is a candidate for redistribution when the mobile station is registered at an MSC/VLR $102_1$, $102_2 \ldots 102_x$ that is unbalanced at the BSC $112_1$, $112_2 \ldots 112_x$ where the mobile station is located and the BSC $112_1$, $112_2 \ldots 112_x$ has not reached its specified "mobile stations movement" quota.

A simple example (1) for one BSC:
MSC 0 BSC 0 VLR Count: 5
MSC 1 BSC 0 VLR Count: 10
MSC 2 BSC 0 VLR Count: 15
Average VLR count across the MSCs for BSC 0=(5+10+15)/3=10
To balance the system, the management device 110 would need to move 5 of BSC 0's VLRs from MSC 2 to MSC 0, leaving 10 BSC 0 VLRs at each MSC:
VLRS_TO_REASSIGN [2, 0, 0]=5
Note: In this example, VLRs corresponds to mobile station.

The act of reassigning mobile stations to another MSC/VLR $102_1$, $102_2 \ldots 102_x$ in the MSC-pool 104 could cause issues (problems) for the gaining MSC/VLR $102_1$ (for example) if that MSC/VLR's current capacity is very high. In particular, if the gaining MSC/VLR $102_1$ (for example) is already handling a lot of mobile calls, then giving that MSC/VLR $102_1$ (for example) a burst of new mobile station calls may cause a temporary overload condition at that MSC/VLR $102_1$ (for example). To address this situation, the management device 110 can be configured if desired to establish and enforce a predetermined rate at which mobile stations are re-assigned to a receiving MSC/VLR $102_1$ (for example) that would be based on the receiving MSC/VLR's current capacity load. For instance, the management device 110 can implement a tiered based reassignment rate which is dependent on the operational capacity factors of the MSC/VLRs $102_1, 102_2 \ldots 102_x$ within the MSC-pool 104. For example:

- While any MSC/VLR $102_1, 102_2 \ldots 102_x$ in the MSC-pool 104 has an operational capacity factor that is below 40% CPU Utilization (UTIL), limit the number of reassignments to 600 mobile stations in any given second for any gaining MSC/VLR $102_1, 102_2 \ldots 102_x$.
- Further limit the number of reassignments to 300 mobile stations in any given second if all MSC/VLRs $102_1, 102_2 \ldots 102_x$ in MSC-pool 105 have an operational capacity factor that is above 40% CPU UTIL and the CPU UTIL value for all MSC/VLRs $102_1, 102_2 \ldots 102_x$ in the MSC-pool 104 differ by no more than 10 percentage units.
- Further limit the number of reassignments to 150 mobile stations in any given second if all MSC/VLRs $102_1, 102_2 \ldots 102_x$ in MSC-pool 104 are above 40% CPU UTIL and the CPU UTIL value for all MSC/VLRs $102_1, 102_2 \ldots 102_x$ in the MSC-pool 104 differ by no more than 5 percentage units.

Note: the above bulleted items only serve as an example. The idea is to control the reassignment rate to a gaining MSC/VLR $102_1$ (for example). The rate of reassignment is based on the amount of CPU work at the gaining MSC/VLR $102_1$ (for example) and in other MSC/VLRs $102_2, 102_3 \ldots 102_x$ (for example) across the MSC-pool 104.

Figure 4:
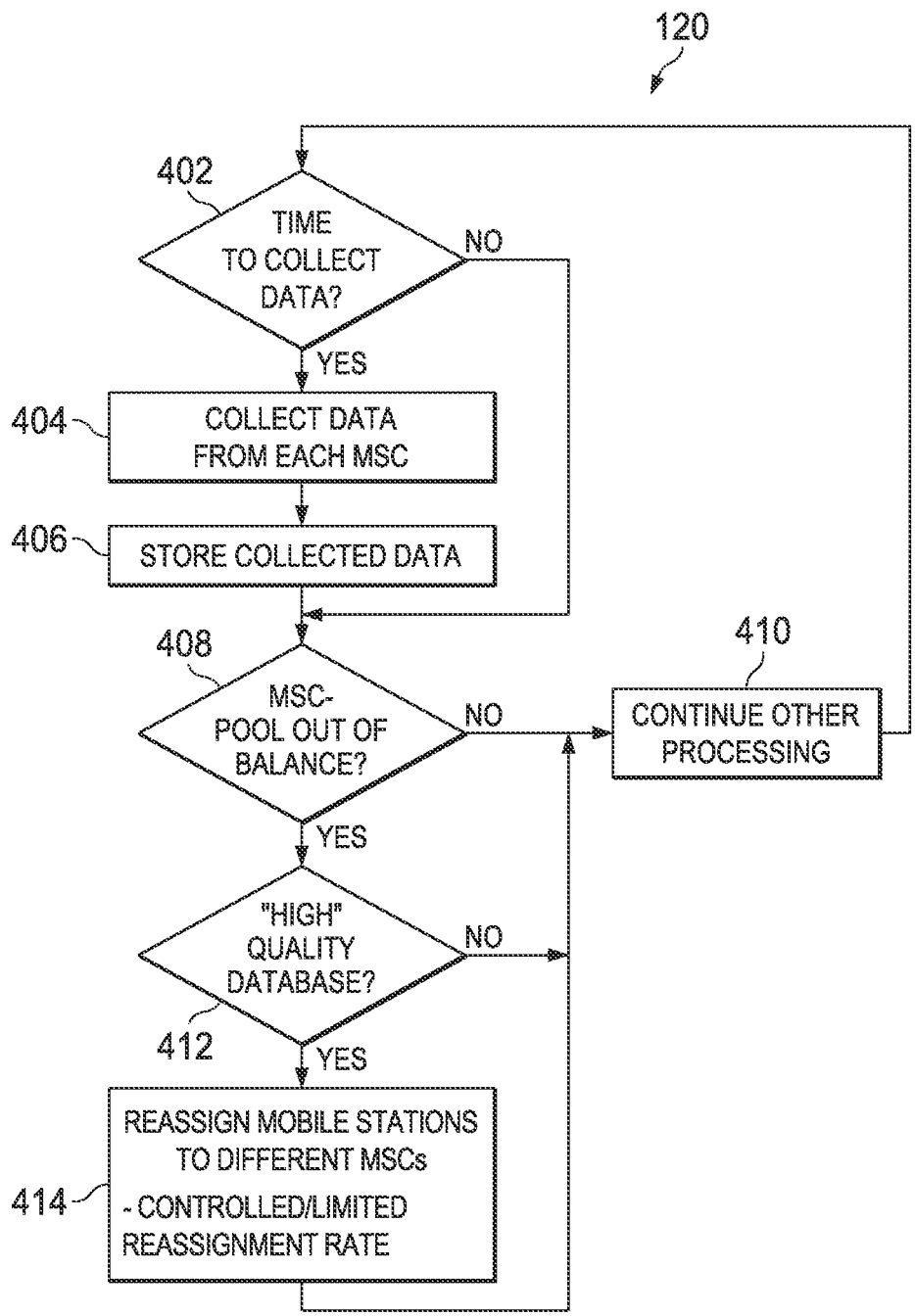
FIG. 4 is a flowchart illustrating an exemplary mobile station redistribution scheme implemented in the new management device in accordance with an embodiment of the present invention.

Referring to FIG. 4, there is a flowchart illustrating an exemplary mobile station redistribution scheme 120 which is implemented in the management device 110 in accordance with an embodiment of the present invention. Beginning at step 402, the management device 110 determines if it is time to collect the data $132_1, 132_2 \ldots 132_x$ from each of the MSC/VLRs $102_1, 102_2 \ldots 102_x$. If the result of step 402 is yes, then the management device 110 at step 404 collects the data $132_1, 132_2 \ldots 132_x$ from each of the MSC/VLRs $102_1, 102_2 \ldots 102_x$ (e.g., periodically collect the data $132_1, 132_2 \ldots 132_x$ for instance several times a day). After step 404, the management device 110 at step 406 stores the collected data $132_1, 132_2 \ldots 132_x$ in the database 126. After step 406 or if the result of step 402 is no, the management device 110 at step 408 detects if there is an unbalanced condition within the MSC-pool 104. For instance, the management device 110 can detect that there is an unbalanced condition within the MSC-pool 104 when: (1) a total number of mobile stations $108_{1a}, 108_{1b} \ldots 108_{1x}, 108_{2a}, 108_{2b} \ldots 108_{2x}$ and $108_{xa}, 108_{xb} \ldots 108_{xx}$ assigned to each MSC/VLR $102_1, 102_2 \ldots 102_x$ is not equal per a specified tolerance at each MSC/VLR $102_1, 102_2 \ldots 102_x$ in the MSC-pool 104; and (2) a total number of mobile stations $108_{1a}, 108_{1b} \ldots 108_{1x}, 108_{2a}, 108_{2b} \ldots 108_{2x}$ and $108_{xa}, 108_{xb} \ldots 108_{xx}$ registered at each BSC $112_1, 112_2 \ldots 112_x$ at each MSC/VLR $102_1, 102_2 \ldots 102_x$ in the MSC-pool 104 is not equal per a specified tolerance at each BSC $112_1, 112_2 \ldots 112_x$ at each MSC/VLR $102_1, 102_2 \ldots 102_x$ in the MSC-pool 104. If the result of step 408 is no, then the management device 110 at step 410 continues other processing before returning to step 402. If the result of step 408 is yes, then the management device 110 at step 412 determines if there is a "high" quality database 126. For instance, the management device 110 can determine if there is a "high" quality database 126 by checking if a total number of records in the database 126 related to assigned mobile stations $108_{1a}, 108_{1b} \ldots 108_{1x}, 108_{2a}, 108_{2b} \ldots 108_{2x}$ and $108_{xa}, 108_{xb} \ldots 108_{xx}$ equals per a specified tolerance a total number of mobile stations $108_{1a}, 108_{1b} \ldots 108_{1x}, 108_{2a}, 108_{2b} \ldots 108_{2x}$ and $108_{xa}, 108_{xb} \ldots 108_{xx}$ served by all of the MSC/VLRs $102_1, 102_2 \ldots 102_x$ in the MSC-pool 104. If the result of step 412 is no, then the management device 110 proceeds to step 410 to continue other processing before returning to step 402. If the result of step 412 is yes, then the management device 110 at step 414 reassign one or more mobile stations $108_{1a}, 108_{1b} \ldots 108_{1x}, 108_{2a}, 108_{2b} \ldots 108_{2x}$ and $108_{xa}, 108_{xb} \ldots 108_{xx}$ to different MSC/VLRs $102_1, 102_2 \ldots 102_x$. Typically, the management device 110 reassigns only mobile stations $108_{1a}, 108_{1b} \ldots 108_{1x}, 108_{2a}, 108_{2b} \ldots 108_{2x}$ and $108_{xa}, 108_{xb} \ldots 108_{xx}$ which are active in the wireless telecommunications network 100. In one example, the management node 110 can reassign one or more mobile stations $108_{1a}, 108_{1b} \ldots 108_{1x}, 108_{2a}, 108_{2b} \ldots 108_{2x}$ and $108_{xa}, 108_{xb} \ldots 108_{xx}$ to different MSC/VLRs $102_1, 102_2 \ldots 102_x$ such that a total number of mobile stations $108_{1a}, 108_{1}, \ldots 108_{1x}, 108_{2a}, 108_{2b} \ldots 108_{2x}$ and $108_{xa}, 108_{xb} \ldots 108_{xx}$ at each BSC $112_1, 112_2 \ldots 112_x$ at each MSC/VLRs $102_1, 102_2 \ldots 102_x$ is equal within the MSC-pool 104. Further, the management device 110 can reassign one or more mobile stations $108_{1a}, 108_{1b} \ldots 108_{1x}, 108_{2a}, 108_{2b} \ldots 108_{2x}$ and $108_{xa}, 108_{xb} \ldots 108_{xx}$ to different MSC/VLRs $102_1, 102_2 \ldots 102_x$ per a limited reassignment rate for each of the different MSC/VLRs $102_1, 102_2 \ldots 102_x$. At the end of step 414, the management device 110 continues other processing per step 410 before returning to step 402.

Combined Mobile Station Initial Distribution and Redistribution Schemes 118 and 120

Figure 5:
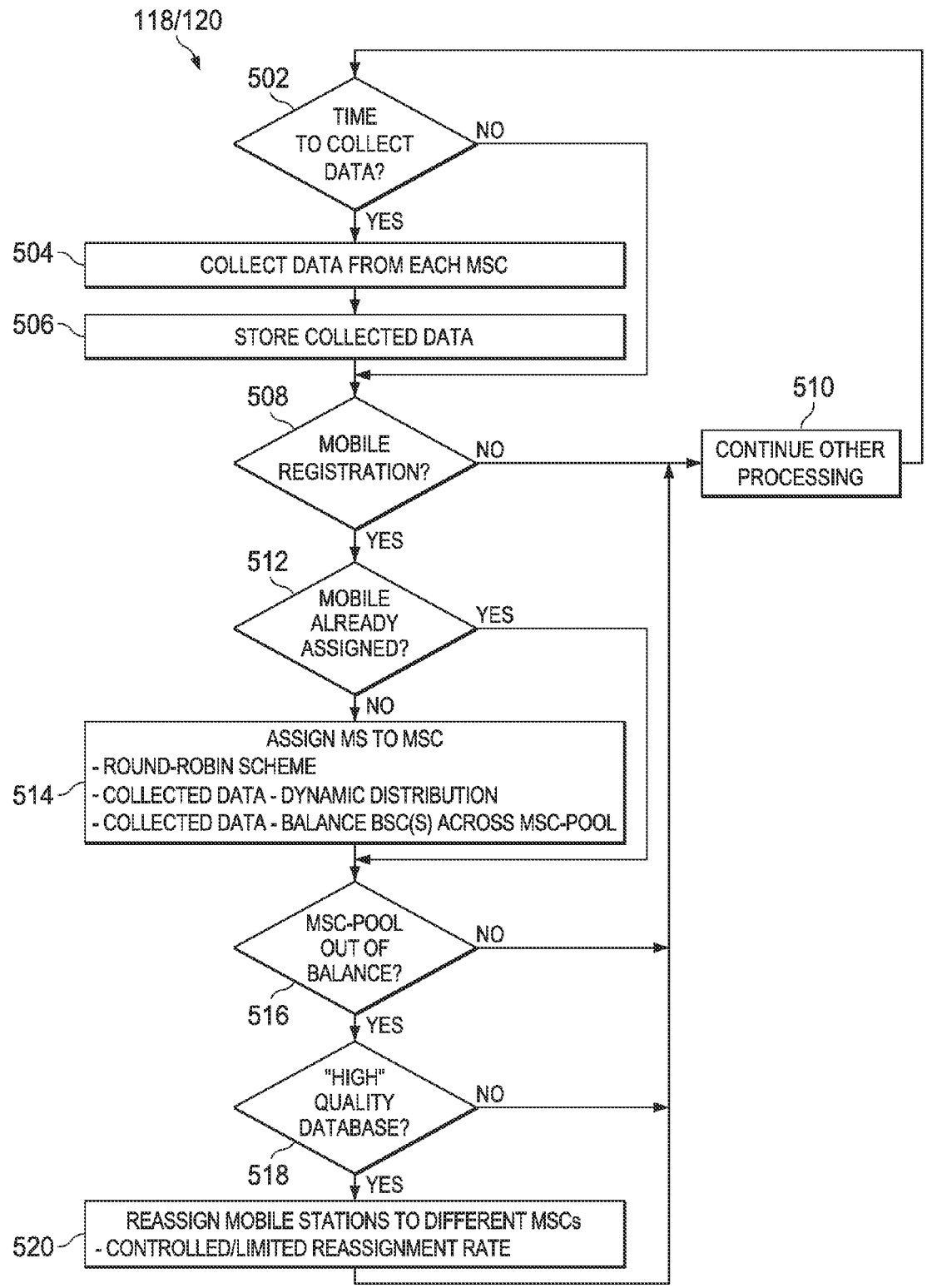
FIG. 5 is a flowchart illustrating both the exemplary mobile station initial distribution scheme and the exemplary mobile station redistribution scheme which can be implemented in the new management device in accordance with an embodiment of the present invention.

Referring to FIG. 5, there is a flowchart illustrating both the exemplary mobile station initial distribution scheme 118 and the exemplary mobile station redistribution scheme 120 being implemented in the management device 110 in accordance with an embodiment of the present invention. Beginning at step 502, the management device 110 determines if it is time to collect the data $132_1, 132_2 \ldots 132_x$ from each of the MSC/VLRs $102_1, 102_2 \ldots 102_x$. If the result of step 502 is yes, then the management device 110 at step 504 collects the data $132_1, 132_2 \ldots 132_x$ from each of the MSC/VLRs $102_1, 102_2 \ldots 102_x$ (e.g., periodically collect the data $132_1, 132_2 \ldots 132_x$ for instance several times a day). After step 504, the management device 110 at step 506 stores the collected data $132_1, 132_2 \ldots 132_x$ in the database 126. After step 506 or if the result of step 502 is no, the management device 110 at step 508 determines if one of the mobile stations $108_{1a}$ (for example) has requested registration (explicit or implicit) with one of the BSCs $112_1, 112_2 \ldots 112_x$. If the result of step 508 is no, then the management device 110 at step 510 continues other processing before returning to step 502. If the result of step 508 is yes, then the management device 110 at step 512 determines if the mobile station $108_{1a}$ (for example) has already been assigned to one of the MSC/VLRs $102_1, 102_2 \ldots 102_x$. If the result of step 512 is no, then the management device 110 at step 514 assigns the mobile station $108_{1a}$ (for example) to one of the one of the MSC/VLRs $102_1, 102_2 \ldots 102_x$, wherein the assignment of the mobile station $108_{1a}$ (for example) to one of the MSC/VLRs $102_1, 102_2 \ldots 102_x$ is based at least in part on the collected data $132_1, 132_2 \ldots 132_x$ (for more details see discussion above).

If the result of step 512 is yes or after step 514, the management device 110 at step 516 detects if there is an unbalanced condition within the MSC-pool 104 (for more details see discussion above). If the result of step 516 is no, then the management device 110 performs other processing at step 510 before returning to step 502. If the result of step 516 is yes, then the management device 110 at step 518 determines if there is a "high" quality database 126 (for more details see above discussion). If the result of step 518 is no, then the management device 110 performs other processing per step 510 before returning to step 502. If the result of step 518 is yes, then the management device 110 at step 520 reassigns one or more mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ to different MSC/VLRs $102_1$, $102_2$ ... $102_x$ (for more details see above discussion). At the end of step 520, the management device 110 performs other processing per step 510 before returning to step 502.

Variations to Mobile Station Initial Distribution and Redistribution Schemes 118 and 120

It should be appreciated that there are many possible variants to the mobile station initial distribution scheme 118 and the mobile station redistribution scheme 120 based on the fact that the management device 110 can perform mobile station assignment and reassignment to a MSC/VLR $102_1$, $102_2$ ... $102_x$ based on dynamic criteria rather than using static criteria or mapping. The following are some exemplary variants to the mobile station initial distribution scheme 118 and the mobile station redistribution scheme 120.

- The assignment of a mobile station $108_{1a}$ (for example) to a MSC/VLR $102_1$, $102_2$ ... $102_x$ within the MSC/VLR pool 104 during the initial access/registration (explicit or implicit) to the MSC-pool 104 could be based on an algorithm (process) that balances the MSC-pool 104 per MSC/VLR $102_1$, $102_2$ ... $102_x$ per BSC location, instead of just a round robin scheme across all MSC/VLRs $102_1$, $102_2$ ... $102_x$ in the MSC-pool 104. The idea is ensure that each configured BSC location in the MSC/VLRs $102_1$, $102_2$ ... $102_x$ of MSC-pool 104 is properly balanced across the MSC-pool 104 from the very beginning. This could help to reduce the number of mobile station reassignments during runtime when an imbalanced MSC-pool 104 is detected.
- The assignment of a mobile station $108_{1a}$ (for example) to one of the MSC/VLRs $102_1$, $102_2$ ... $102_x$ within the MSC-pool 104 during the initial access/registration (explicit or implicit) to the MSC-pool 104 could be based on an algorithm (process) that balances the MSC-pool 104 based on the current capacity load of each MSC/VLR $102_1$, $102_2$ ... $102_x$, instead of just a round robin scheme across all MSC/VLRs $102_1$, $102_2$ ... $102_x$ in the MSC-pool 104. This would ensure that a MSC/VLR $102_1$, $102_2$ ... $102_x$ at a high capacity does not continually get more work when other MSC/VLRs $102_1$, $102_2$ ... $102_x$ in the MSC-pool 104 can handle the new workload better. However, using a capacity-based algorithm (process) for the initial mobile station assignment to a MSC/VLR $102_1$, $102_2$ ... $102_x$ may increase the number of mobile station reassignments during runtime when an imbalanced MSC-pool 104 is detected because MSC/VLR capacity load changes very dynamically.
- The mobile station reassignment to another MSC/VLR $102_1$, $102_2$ ... $102_x$ in the MSC-pool 104 could consider the MSC/VLR capacity load associated with each MSC/VLR $102_1$, $102_2$ ... $102_x$ in the MSC-pool 104. The reassignment algorithm (process) would assign mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ to proportion the number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ assigned to the BSCs $112_1$, $112_2$ ... $112_x$ in the MSC/VLRs $102_1$, $102_2$ ... $102_x$ based on the MSC/VLR's current capacity load. Therefore, the number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ assigned to a MSC/VLR $102_1$, $102_2$ ... $102_x$ would be to give each MSC/VLR $102_1$, $102_2$ ... $102_x$ a percentage of the mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ at each of the BSCs $112_1$, $112_2$ ... $112_x$ based on the MSC/VLR's current capacity load. However, using a capacity-based algorithm for the mobile station reassignment to a MSC/VLR $102_1$, $102_2$ ... $102_x$ may increase the number of mobile station reassignments during runtime when an imbalanced MSC-pool 104 is detected because the MSC/VLR capacity load changes very dynamically.
- The mobile station reassignment to a MSC/VLR $102_1$, $102_2$ ... $102_x$ in the MSC-pool 104 could consider redistribution based on the number of "active" mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ at each MSC/VLR $102_1$, $102_2$ ... $102_x$ (or per MSC/VLR $102_1$, $102_2$ ... $102_x$ per BSC $112_1$, $112_2$ ... $112_x$) in the MSC-pool 104. The active mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ happen to be currently utilizing network resources. This could be an alternative method if for some reason the MSC/VLR $102_1$, $102_2$ ... $102_x$ capacity could not be determined.

In general the above description assumes that each MSC/VLR $102_1$, $102_2$ ... $102_x$ in the MSC-pool 104 has the same capacity capabilities. If this were not true, then the algorithms (processes) and methods described herein could be modified to distribute the number of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ per MSC/VLR $102_1$, $102_2$ ... $102_x$ per BSC $112_1$, $112_2$ ... $112_x$ based on the percentage of capacity capabilities that each MSC/VLR $102_1$, $102_2$ ... $102_x$ had within the MSC-pool 104.

In view of the foregoing, one skilled in the art will readily appreciate that the management device 110 described herein is configured to manage an initial distribution of mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ to individual core network nodes $102_1$, $102_2$ ... $102_x$ (e.g., MSC/VLRs $102_1$, $102_2$ ... $102_x$) within a core network node pool 104 (e.g. MSC-pool 104) and/or manage a redistribution of one or more of the mobile stations $108_{1a}$, $108_{1b}$ ... $108_{1x}$, $108_{2a}$, $108_{2b}$ ... $108_{2x}$ and $108_{xa}$, $108_{xb}$ ... $108_{xx}$ across the core network nodes $102_1$, $102_2$ ... $102_x$ (e.g., MSC/VLRs $102_1$, $102_2$ ... $102_x$) within the core network node pool 104 (e.g. MSC-pool 104) when an unbalanced condition is detected within the core network node pool 104 (MSC-pool 104). In one embodiment, the management device 110 can comprise at least one processor 128 and at least one memory 130 that stores processor-executable instructions, wherein the at least one processor 128 interfaces with the at least one memory 130 to execute the processor-executable instructions, whereby the management device is operable to: (1) collect data $132_1$, $132_2$ ... $132_x$ from each of the core network nodes $102_1$, $102_2$ ... $102_x$ (e.g., MSC/VLRs $102_1$, $102_2$ ... $102_x$); (2) store the collected data $132_1$, $132_2$ ... $132_x$ in a database 126; and (3) implement at least one of the mobile station initial distribution scheme 118 and the mobile station redistribution scheme 120. The mobile station initial distribution scheme 118 is implemented when each of the mobile stations $108_{1a}$, $108_{1b} \ldots 108_{1x}$, $108_{2a}$, $108_{2b} \ldots 108_{2x}$ and $108_{xa}$, $108_{xb} \ldots 108_{xx}$ registers with one of the control nodes $112_1$, $112_2 \ldots 112_x$ (e.g., BSC $112_1, 112_2 \ldots 112_x$) where each of the mobile stations $108_{1a}, 108_{1b} \ldots 108_{1x}, 108_{2a}, 108_{2b} \ldots 108_{2x}$ and $108_{xa}, 108_{xb} \ldots 108_{xx}$ is assigned to one of the core network nodes $102_1, 102_2 \ldots 102_x$ (e.g., MSC/VLRs $102_1, 102_2 \ldots 102_x$) based at least in part on the collected data $132_1, 132_2 \ldots 132_x$ (see also FIGS. 2 and 5). The mobile station redistribution scheme 120 is implemented when an unbalanced condition is detected within the core network node pool 104 (MSC-pool 104) and then one or more of the mobile stations $108_{1a}, 108_{1b} \ldots 108_{1x}, 108_{2a}, 108_{2b} \ldots 108_{2x}$ and $108_{xa}, 108_{xb} \ldots 108_{xx}$ are reassigned to different core network nodes $102_1, 102_2 \ldots 102_x$ (e.g., MSC/VLRs $102_1, 102_2 \ldots 102_x$) based at least in part on the collected data $132_1, 132_2 \ldots 132_x$ (see also FIGS. 3-5).

The management device 110, the mobile station initial distribution scheme 118, and the mobile station redistribution scheme 120 of the present invention can have many features some of which are as follows:

1. A method in a management device for the initial distribution of mobile station information within a pool of MSC/VLR serving nodes in a cellular radio communications system, where the MSC-pool is able to communicate with one or more radio access nodes, the method comprises:

Identifying from receipt of a UE registration request (explicit/implicit) that the mobile station needs to be assigned to a MSC/VLR within the MSC-pool;

Assignment of the mobile station information to a MSC/VLR within the MSC-pool; and Storing the mobile station assignment within a database for future routing purposes.

1A. The method of feature 1, wherein the mobile station is assigned to a MSC/VLR within the MSC-pool selected from all available MSC/VLR based on a round robin algorithm.

1B. The method of feature 1, wherein the initial distribution of mobile station information across the MSC-pool provides a balanced MSC-pool.

2. A method at a management device for the detection, during runtime operations, of a mobile station information imbalance within a MSC-pool in a cellular radio communications system, where the MSC-pool is able to communication with one or more radio access nodes, the method comprises:

Determination of the MSC-pool distribution characteristics from each MSC/VLR within the MSC-pool;

Collection of the total number of mobile stations located at each BSC from each MSC/VLR within the MSC-pool; and Determination of whether the MSC-pool is balanced or unbalanced.

2A. The method of feature 2, wherein the distribution characteristics comprise total number of mobile stations assigned to each MSC/VLR within the MSC-pool, capacity utilization for each MSC/VLR within the MSC-pool, and MSC/VLR availability for each MSC/VLR within the MSC-pool.

2B. The method of feature 2, wherein the method includes the ability to set the data collection period.

2C. The method of feature 2, wherein the method comprises a determination whether the mobile station to MSC/VLR mapping database is properly synchronized. For instance, this can be a specific calculation, using an algorithm (process) where the database synchronization percentage is not larger than (10−K), where K is the number of MSC/VLR serving nodes within the MSC-pool.

2D. The method of feature 2C, wherein the specific algorithm (process) to determine whether the mobile station to MSC/VLR mapping database is properly synchronized is defined to be:

If not ((abs (# SNSF database entries−# Pool wide VLR entries)/# Pool wide VLR entries)*100>(10−k)), where K is the total number of MSC/VLR serving nodes in the MSC-pool, then the mobile station to MSC/VLR mapping database is properly synchronized 2E. The method of feature 2, wherein the specific algorithm to determine whether the MSC-pool is balanced or unbalanced is defined to be:

```
DIST_DATA [n, m]
  = ABS (( MSC_VLR_ENTRIES_PER_BSC [n, m]
      − AVG ( MSC_VLR_ENTRIES_PER_BSC [n, m] )
    )
    / AVG ( MSC_VLR_ENTRIES_PER_BSC [n, m] )
  ) * 100
IF DIST_DATA [n, m] > (x − (k/2))
then
  out of balance
else
  in-balance
endif
```

Where n=local MSC/VLR service ID, m=BSC number, k=number of MSCs in the pool, x=a constant that represents the maximum value of the threshold. The determination of whether a BSC is out of balance is computed for each BSC at each MSC/VLR.

2F. The method of feature 2, wherein the management device has a processing unit and database to store and recover the mobile station to MSC/VLR assignment mapping information.

3. A method at a management device for redistribution, during runtime operations, of mobile station information where a mobile station information imbalance has been detected within a MSC-pool in a cellular radio communications system, where the MSC-pool is able to communication with one or more radio access nodes, the method comprises:

Identifying from receipt of a UE registration request (explicit/implicit) whether the mobile station is a candidate to be redistributed to another MSC/VLR within the MSC-pool;

Redistribution of the mobile station when the MSC-pool is unbalanced and the mobile station is a candidate for redistribution;

Assignment of the mobile station information to a MSC/VLR within the MSC-pool; and Storing the mobile station assignment within a database for future routing purposes.

3A. The method of feature 3, wherein the specific determination of whether the mobile station is a candidate for redistribution within the MSC-pool is defined to be: the mobile station is registered at a MSC/VLR that is unbalanced at the BSC where the mobile station is located and the BSC has not reached its specified "mobile station movement" quota.

3B. The method of feature 3, wherein the determination whether the MSC-pool is balanced or unbalanced uses the methods and code as defined in feature 2E.

3C. The method of feature 3, wherein the redistribution of a mobile station candidate to a new MSC/VLR is performed, the MSC/VLR selection is based on whether the MSC/VLR is unbalanced at the BSC location where the mobile station resides, and the MSC/VLR must gain new mobile stations in order to become balanced.

3D. The method of feature 3, wherein the management device has a processing unit and database to store and recover the mobile station to MSC/VLR assignment mapping information 3E. The method of feature 3, wherein the management device during runtime operations performs MSC-pool unbalance detection and redistribution to keep the MSC-pool balanced.

3F. The method of feature 3, wherein the management device during runtime operations performs MSC-pool unbalance detection and redistribution to keep the number of mobile stations at each BSC, at each MSC/VLR within the MSC-pool balanced.

3G. The method of feature 3, wherein the mobile station redistribution is performed to ensure that no MSC/VLR serving node can be overwhelmed during the MSC-pool station-rebalancing phase.

3H. The method of feature 3G, wherein the mobile station redistribution utilizes the MSC/VLR capacity utilization to determine the rate of mobile station redistribution to each MSC/VLR.

3I. The method of feature 3H, wherein the MSC/VLR mobile station redistribution rate is determined based on specific MSC/VLR capacity utilization, and the redistribution rate is based on mobile station reassignments per second to each MSC/VLR within the MSC-pool.

3J. The method of feature 3H, wherein the MSC/VLR mobile station redistribution rate is determined based on specific MSC/VLR capacity utilization, and the redistribution rate is multi-tiered in such a way that a range of MSC/VLR capacity utilization values represents a specific mobile station redistribution rate to each MSC/VLR within the MSC-pool.

The management device 110, the mobile station initial distribution scheme 118, and the mobile station redistribution scheme 120 of the present invention have many advantages and improvements over existing systems and methods some of which are as follows:

Provides a solution for the initial assignment of mobile stations within a wireless telecommunications network which has a MSC-pool, in order to have a balanced workload across the MSC-pool resources.

Provides a solution for redistribution of mobile station information within a wireless telecommunications network which has a MSC-pool that has become unbalanced with respect to mobile station information.

Provides an advantage within a wireless telecommunications network which has a MSC-pool such that the MSC-pool recovery time will be much faster after the failure of a MSC/VLR serving node within the MSC-pool because the MSC-pool workload balance is maintained.

Provides an advantage within a wireless telecommunications network which has a MSC-pool such that the MSC-pool will be more likely to be capacity load balanced across all MSC/VLR serving nodes in the MSC-pool because the MSC-pool balance is maintained.

Existing systems and methods of redistribution of mobile station information in a cellular telecommunication network where MSC serving nodes are arranged in a MSC-pool do not guarantee a workload balance across the MSC-pool.

Existing systems and methods of redistribution of mobile station information in a cellular telecommunication network where MSC serving nodes are arranged in a MSC-pool do not ensure that the mobile station redistribution process does not add additional processing stress on the system resource such that overload conditions occur.

Existing systems and methods of redistribution of mobile station information in a cellular telecommunication network where MSC serving nodes are arranged in a MSC-pool often require a manual intervention by the operator to properly rebalance the workload across the MSC-pool.

Existing systems and methods of redistribution of mobile station information in a cellular telecommunication network where MSC serving nodes are arranged in a MSC-pool do not consider the accuracy of the mobile station to MSC/VLR assignment mapping database.

Existing systems and methods of redistribution of mobile station information in a cellular telecommunication network where MSC serving nodes are arranged in a MSC-pool do not consider that mobile station location imbalance can affect the performance of the MSC-pool.

Existing systems and methods of redistribution of mobile station information in a cellular telecommunication network where MSC serving nodes are arranged in a MSC-pool do not consider that mobile station location imbalance can affect the performance of MSC/VLR recovery of the MSC-pool.

Note: It should be appreciated that whenever the term MSC/VLR was used herein it could have also been described as a core network node and when then term BSC was used herein it could have also been described as core node.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A management device configured to be implemented in a wireless telecommunications network which further comprises at least a plurality of core network nodes which form a core network node pool, a plurality of mobile stations, and a plurality of control nodes, wherein the management device comprising:

at least one processor; and,
at least one memory that stores processor-executable instructions, wherein the at least one processor interfaces with the at least one memory to execute the processor-executable instructions, whereby said management device is operable to:
collect data from each of the core network nodes, wherein the collected data comprises: a number of currently registered mobile stations in each of the core network nodes, and a number of mobile stations currently registered at each control node served by each of the core network nodes;
store the collected data in a database;
implement a mobile station redistribution scheme, whereby the management device is operable to:

detect whether there is an unbalanced condition within the core network node pool, wherein there is an unbalanced condition within the core network node pool when:
  a total number of mobile stations assigned to each core network node is not equal per a specified tolerance at each core network node in the core network node pool; and
  a total number of mobile stations registered at each control node served by each core network node in the core network node pool is not equal per a specified tolerance at each control node served by each core network node in the core network node pool;
based on a result of the detect operation being yes, reassign one or more mobile stations to different core network nodes, wherein the reassignment of the one or more of the mobile station is based at least in part on the collected data; and
based on a result of the detect operation being no, continue to collect and store data from each of the core network nodes and repeat the detect operation.

2. The management device of claim 1, wherein the data from each of the core network nodes is periodically collected.

3. The management device of claim 1, wherein the management device further implements the mobile station redistribution scheme as follows after detecting the unbalanced condition within the core network node pool but before reassigning one or more mobile stations to different core network nodes, determine whether a total number of records in the database related to assigned mobile stations equals per a specified tolerance a total number of mobile subscribers assigned to all of the core network nodes in the core network node pool and based on the determination being yes reassign one or more mobile stations to different core network nodes and based on the determination being no continue to collect and store data from each of the core network nodes and repeats the detect operation.

4. The management device of claim 1, wherein the management device further implements the mobile station redistribution scheme to reassign one or more mobile stations to different core network nodes such that a total number of mobile stations at each control node at each core network node is equal within the core network node pool.

5. The management device of claim 4, wherein the management device is operable to reassign only mobile stations, which are active in the wireless telecommunications network.

6. The management device of claim 4, wherein the management device is operable to reassign one or more mobile stations to different core network nodes per a limited reassignment rate for each of the different core network nodes.

7. The management device of claim 1, wherein the management device is further operable to implement a mobile station initial distribution scheme, whereby the management device is operable to
  determine whether one of the mobile stations has requested registration with one of the control nodes;
  based on a result of the determine operation being yes, assign the mobile station to one of the core network nodes, wherein the assignment of the mobile station to one of the core network nodes is based at least in part on the collected data; and,
  based on a result of the determine operation being no, continue to collect and store data from each of the core network nodes and repeat the determine operation.

8. The management device of claim 7, wherein the management device further implements the mobile station initial distribution scheme as follows prior to the assign operation further check whether the mobile station has already been assigned to one of the core network nodes and based on the check being no proceed to the assign operation and based on the check being yes continue to collect and store data from each of the core network nodes and repeat the determine operation.

9. The management device of claim 7, wherein the management device further implements the mobile station initial distribution scheme to use the collected data to determine which of the core network nodes are currently available and then use a round-robin-scheme to assign the mobile station to one of the currently available core network nodes.

10. The management device of claim 7, wherein the collected data further comprises at least one of a capacity potential of each of the core network nodes, and a current capacity load of each of the core network nodes.

11. The management device of claim 7, wherein the management device further implements the mobile station initial distribution scheme to use the collected data when assigning the mobile station to one of the core network nodes so as to balance a load of each control node across the control network node pool.

12. A method in a management device which is in a wireless telecommunications network which further comprises at least a plurality of core network nodes which form a core network node pool, a plurality of mobile stations, and a plurality of control nodes, wherein the method comprising:
  collecting data from each of the core network nodes, wherein the collected data comprises: a number of currently registered mobile stations in each of the core network nodes, and a number of mobile stations currently registered at each control node served by each of the core network nodes;
  storing the collected data in a database;
  implementing a mobile station redistribution scheme, whereby the management device performs the following:
    detecting whether there is an unbalanced condition within the core network node pool, wherein there is an unbalanced condition within the core network node pool when:
    a total number of mobile stations assigned to each core network node is not equal per a specified tolerance at each core network node in the core network node pool; and
    a total number of mobile stations registered at each control node served by each core network node in the core network node pool is not equal per a specified tolerance at each control node served by each core network node in the core network node pool;
    based on a result of the detecting step being yes, reassigning one or more mobile stations to different core network nodes, wherein the reassignment of the one or more of the mobile station is based at least in part on the collected data; and
    based a result of the detecting step being no, continuing to collect and store data from each of the core network nodes and repeating the detecting step.

13. The method of claim 12, wherein the collecting step further comprises periodically collecting data from each of the core network nodes.

14. The method of claim 12, wherein the management device further implements the mobile station redistribution scheme as follows after detecting the unbalanced condition within the core network node pool but before reassigning one or more mobile stations to different core network nodes, determining whether a total number of records in the database related to assigned mobile stations equals per a specified tolerance a total number of mobile subscribers assigned to all of the core network nodes in the core network node pool and based on the determination being yes reassigning one or more mobile stations to different core network nodes and based on the determination being no continuing to collect and store data from each of the core network nodes and repeating the detecting step.

15. The method of claim 12, wherein the management device further implements the mobile station redistribution scheme by reassigning one or more mobile stations to different core network nodes such that a total number of mobile stations at each control node at each core network node is equal in the core network node pool.

16. The method of claim 15, wherein the the management device reassigns only mobile stations which are active in the wireless telecommunications network.

17. The method of claim 15, wherein the the management device reassigns one or more mobile stations to different core network nodes per a limited reassignment rate for each of the different core network nodes.

18. The method of claim 12, further comprising:
implementing a mobile station initial distribution scheme, whereby the management device performs the following;
determining whether one of the mobile stations has requested registration with one of the control nodes;
based on a result of the determining step being yes, assigning the mobile station to one of the core network nodes, wherein the assignment of the mobile station to one of the core network nodes is based at least in part on the collected data; and,
based on a result of the determining step being no, continuing to collect and store data from each of the core network nodes and repeat the determining step.

19. The method of claim 18, wherein the management device further implements the mobile station initial distribution scheme as follows prior to the assigning step further checking whether the mobile station has already been assigned to one of the core network nodes and based on the check being no proceeding to the assigning step and based on the check being yes continuing to collect and store data from each of the core network nodes and repeat the determining step.

20. The method of claim 18, wherein the management device further implements the mobile station initial distribution scheme by using the collected data to determine which of the core network nodes are currently available and then using a round-robin-scheme to assign the mobile station to one of the currently available core network nodes.

21. The method of claim 18, wherein the collected data further comprises at least one of a capacity potential of each of the core network nodes, and a current capacity load of each of the core network nodes.

22. The method of claim 18, wherein the management device further implements the mobile station initial distribution scheme by using the collected data when assigning the mobile station to one of the core network nodes so as to balance a load of each control node across the control network node pool.

* * * * *